April 11, 1950            G. FASSIN            2,503,661
MOVABLE FILM HOLDER IN APERTURED CASING
AND LOCKING MEANS THEREFOR Filed Oct. 26, 1945            3 Sheets-Sheet 1

INVENTOR.
Gustave Fassin,
BY
Lyle Dillon
ATTORNEY.

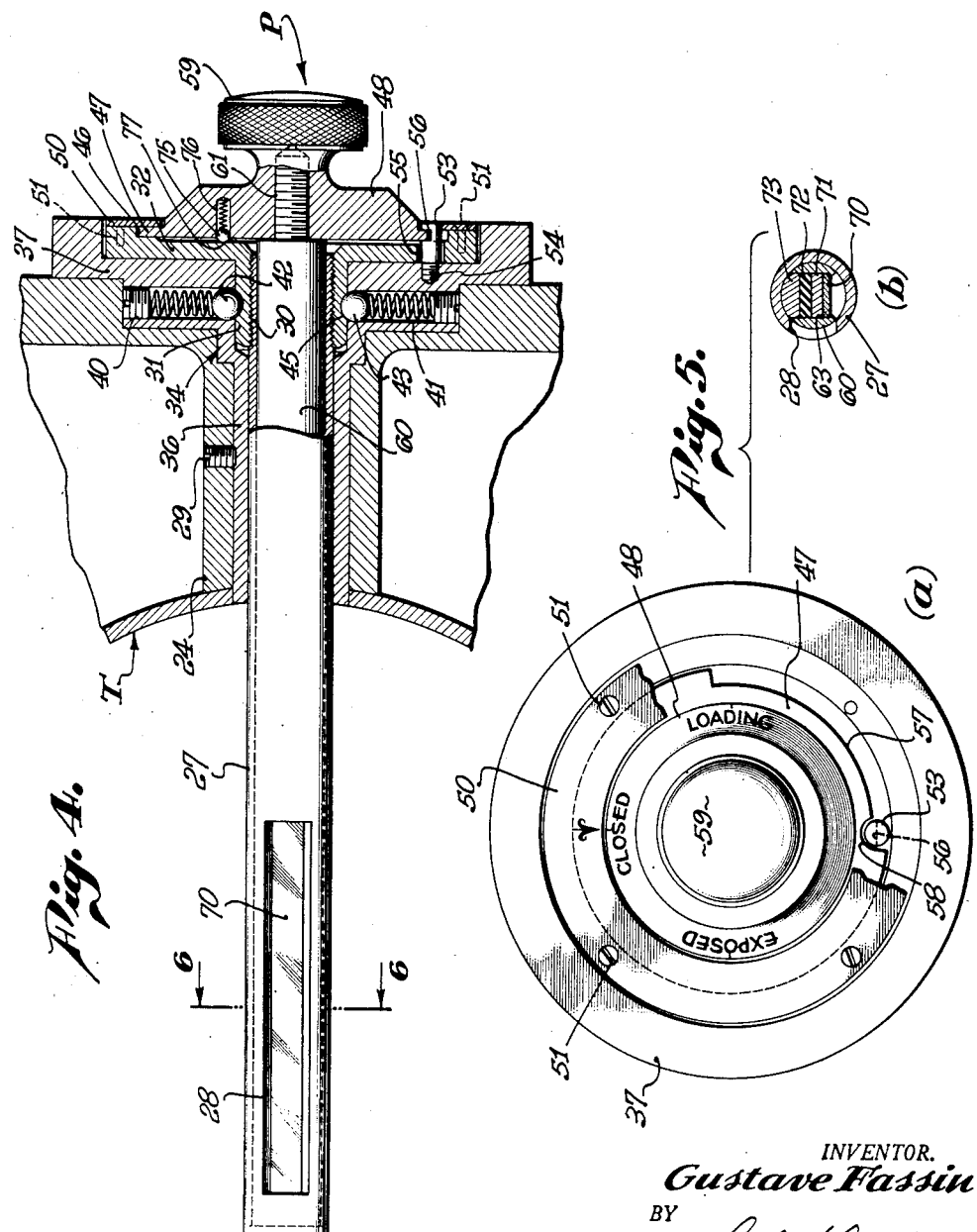

April 11, 1950

G. FASSIN 2,503,661

MOVABLE FILM HOLDER IN APERTURED CASING
AND LOCKING MEANS THEREFOR

Filed Oct. 26, 1945

INVENTOR.
*Gustave Fassin,*
BY *Lyle Dillon*
ATTORNEY.

Patented Apr. 11, 1950

2,503,661

UNITED STATES PATENT OFFICE 2,503,661

MOVABLE FILM HOLDER IN APERTURED CASING AND LOCKING MEANS THEREFOR

Gustave Fassin, Arcadia, Calif., assignor, by mesne assignments, to Applied Research Laboratories, Glendale, Calif., a copartnership Application October 26, 1945, Serial No. 624,706

16 Claims. (Cl. 95—71)

This invention relates to photographic apparatus adapted to be employed in connection with optical instruments, and it relates more particularly to a novel form of photographic plate holder of the type and shape primarily adapted to be employed under certain conditions, usually associated with optical instruments, where it must necessarily be placed in an interfering position in the line of the primary beam of light such as in the optical systems of reflector telescopes, Schmidt type cameras, spectrographs and the like devices employing mirrors as the image-forming elements.

An object of the invention is to provide a plate holder unit of small size so as to occultate a minimum percentage of the primary beam in which such plate holder must be placed.

Another object of this invention is to provide a plate holder embodying automatic means to prevent its inadvertent insertion or withdrawal from the optical instrument in exposed position.

It is another object of this invention to provide a plate holder unit which is simple and compact in construction and free from the long, thin plate holder slides usually associated with such apparatus.

It is a further object to provide a plate holder for which its installation in and removal from the optical system and its actuation between exposure and non-exposure adjustments are accomplished by simple, single-step operations free from the awkward manipulations of attachment or removal of extraneous parts such as the plates, films, and plate holder slides heretofore associated with such apparauts.

These and other objects, advantages, and features of novelty will be evident hereinafter.

In the drawings, which show by way of illustration, a preferred embodiment of the invention and in which like numerals designate the same or similar parts throughout the several views:

Figure 4 is an enlarged, fragmentary detail view, partially in cross-section, of the plate holder mechanism of Figure 2.

Figure 5 is a front elevational view of the dial portion of the apparatus shown in Figure 4, together with a corresponding cross section of the plate holder taken on line 6—6, as adjusted for non-exposure.

Figure 1:
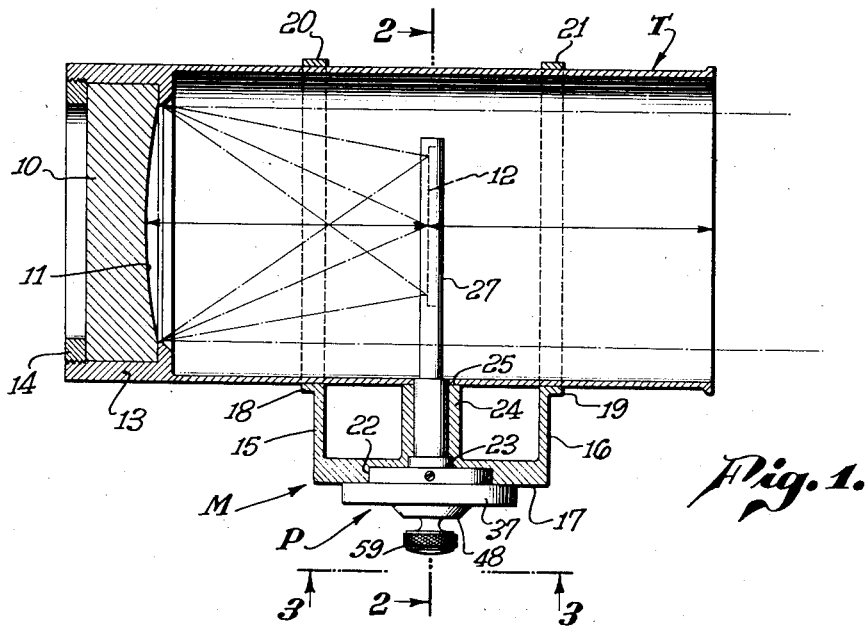
Figure 1 is a longitudinal, sectional view of the general assembly of the apparatus of the invention as associated with a typical optical system.
Figure 2:
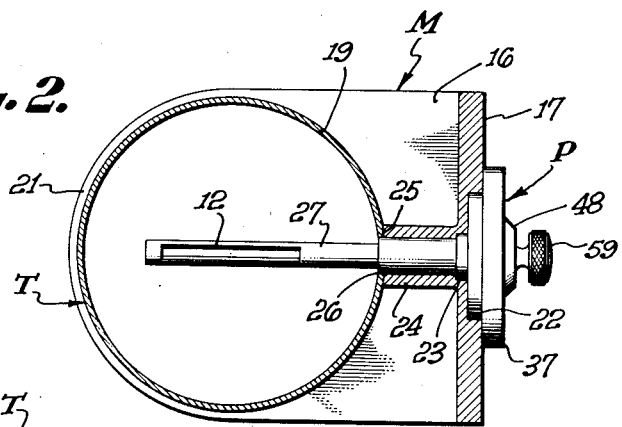
Figure 2 is a cross-sectional view taken on line 2—2 of Figure 1.
Figure 3:
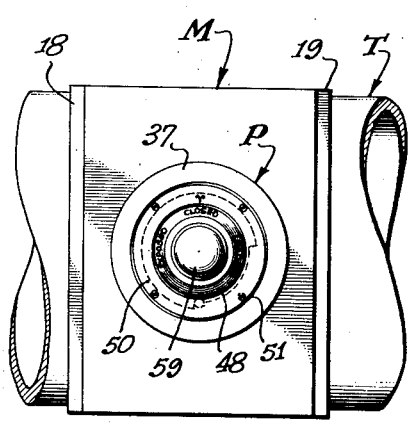
Figure 3 is a front elevation of the apparatus of Figures 1 and 2 as viewed from line 3—3 of Figure 1.

Referring now primarily to Figures 1–3, inclusive, T is a tube of an optical system, such as a reflector telescope, Schmidt camera, or the like apparatus which may employ a concave reflector such as that shown at 10, having a spherical or figured reflector surface 11 as a source of the image to be formed at its focal plane upon the surface of a photographic film or plate which may be located in a position as shown at 12.

The concave reflector 10 may be mounted at one end of the tube T in a suitable integral mounting cell 13, the reflector 10 being retained therein by any suitable means such as a threaded retaining ring 14.

A plate holder stand or mounting assembly M is employed to adapt the film holder and its associated operating mechanism to the optical system and this may be of any construction suited to the type and shape of the housing of the optical system to which it is to be applied, but in the present example where a tubular housing such as that shown at T is employed, the mounting M may comprise a pair of longitudinally spaced web members 15 and 16, integrally interconnected at their outer ends by a panel 17 and having at their opposite ends circular bearing surfaces 18 and 19, fitting the adjacent outer cylindrical surface of the tube T. These web surfaces are adapted to be drawn and retained in firm engagement with the tube T by means of a pair of encircling bands 20 and 21. The mounting M may thus be firmly attached to the tube T of the optical system.

In the mounting panel 17 and coaxial with an extended diameter of the tube T which is perpendicular to the plane of the panel 17, are a pair of coaxial, circular recesses 22 and 23 leading to an integrally formed, inwardly extending, coaxial tubular housing 24, the inner end of which may terminate adjacent to or abut against the adjacent cylindrical surface of the tube T as shown at 25.

A film or plate holder mechanism P is adjustably supported in the beforementioned recesses 22 and 23 and in the housing 24, with the tubular casing 27 of the holder assembly extending therefrom into the tube T through a circular opening 26 provided in the wall thereof, as hereinafter more fully described.

Referring now primarily to Figures 4 and 5, wherein the plate holder mechanism P and its mounting M are illustrated in detail, 27 is a tubular casing member having, adjacent its inner end which extends into the tube T, an elongated, longitudinal aperture 28, forming a window opening into the interior thereof, and normally facing the surface 11 of the reflector 10. The outer, opposite end of the tubular casing member 27 makes screwed connection as shown at 30 with the cylindrical hub 31 of a circular flange member 32.

Contained within the aforesaid recesses 22 and 23 and housing 24 of the mounting M, is an intermediate bushing member 34 of stepwise varying diameter from end to end having an inner tubular section 36 of smallest diameter, a pair of intermediate bearing sections as shown at 23 and 22 of intermediate diameters and an outer flanged section 37 of greatest diameter and provided with inner, intermediate and outer bores of inside diameters corresponding to the beforementioned casing tube 27, hub 31, and disc 32, respectively. The said inner tubular portion 36 of the bushing 34, is supported in the beforementioned housing 24 of the mounting M, and is adjustably fixed therein by means of a set screw 29. The intermediate bearing portion 22 of the bushing 34 is provided with a pair of radially directed drill holes 40 and 41 extending therethrough, and containing a pair of spring-pressed ball catches 42 and 43 adapted when the apparatus is assembled, as illustrated in Figure 4, to latch firmly into an annular groove 45 formed in the outer cylindrical surface of the hub 31.

The beforementioned flanged member 32 has formed in the outer face thereof a shallow, coaxially arranged, circular depression 46 into which the flanged marginal portion 47 of a dial 48 rotatably fits in flush position. The dial 48 is retained in assembled relation longitudinally with respect to the flange member 32, as shown in Figure 4, by means of an annular shaped cover plate 50 which is fixed to the marginal portion of the forward face of the disc 32, which surrounds the beforementioned depression 45, by means of a plurality of screws as shown at 51, and said annular retainer plate 50 thus positioned overlaps the margin of the flanged portion 47 of the dial 48. The flange 47 of the dial 48 is thus slidably retained with freedom for rotation within the inwardly opening annular recess thus formed between the bottom of the depression 47 of the disc 32 and the inner surface of the annular retainer plate 50.

An indexing stop pin 53 threaded at 54 into the bottom surface of the recess of the disc 37 extends axially outward therefrom and is adapted to make a sliding fit and to extend through a registering indexing hole 55 formed in the flange member 32. A slot 56 cut into the inner side of the stop pin 53 is adapted to register with and allow the margin of a cammed sector portion of reduced diameter 57 of the flange 47 of the dial 48 to make a sliding fit therethrough, upon rotation. The said cammed sector portion 57 terminates at its left end as viewed in Figure 5, in a U-shaped marginal relief or depression, as shown at 58, the curved portion thereof having a radius slightly greater than that of the indexing pin 53 and adapted, when located as shown in Figure 5 to clear the slot 56 of the said pin 53.

The dial 48 carries at the outer central portion thereof an operating knob 59 and coaxially from the inner surface thereof a shaft member 60 which makes fixed threaded connection therewith as shown at 61.

The shaft 60 extends from the inner side of the dial 48 to the inner, opposite end of the tubular supporting arm or casing 27 and is rotatable therein through a limited angle about its longitudinal axis as hereinafter more fully described, by means of the dial 48 to which it is threadedly connected and by the knob 59 by means of which the dial is operated.

Figure 6:
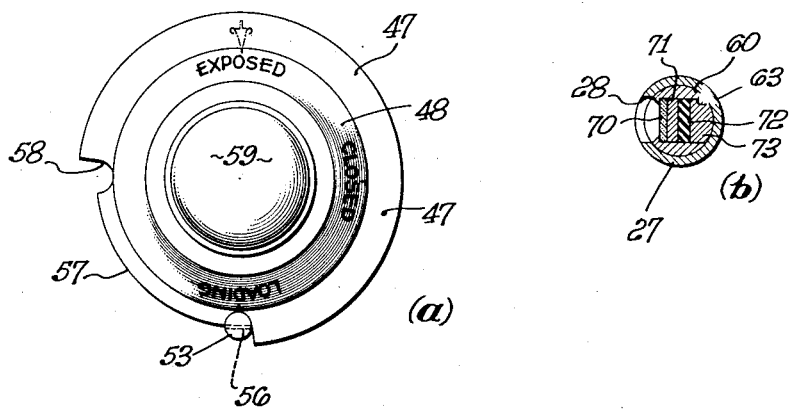
Figure 6 is a front elevational view of the dial of Figure 5 together with a corresponding cross-section of the plate holder taken on line 6—6, as adjusted for exposure.

Referring now to Figure 4, and particularly to the cross-sectional view of Figure 6 (b), the shaft 60 carries a milled slot 62 of the same length as and adapted to register with the beforementioned window 28 formed in the tubular casing 27. The said slot 62 is formed with a rearward, rectangular portion 63 and a forward, outwardly flared portion as shown at 64, said portions 63 and 64 being interconnected through an aperture 65 formed between a pair of longitudinally extending intermediate ridges or abutments 66 and 67.

As viewed in Figure 6 (b), 70 is an elongated, rectangular shaped photographic film strip or photographic plate framed in the aperture 65 and abutting at the upper and lower margins thereof against the inner surfaces of the beformentioned ridges 66 and 67 forming the aperture 65; 71 is a metal backing or pressure plate; 72 is an intermediate layer of resilient material such as sponge rubber; and 73 is a metal cleat having an outer cylindrical surface 60 which matches and, in the assembled position, as shown in Figure 6 (b), makes a sliding fit with the inner cylindrical surface of the tubular supporting casing 27 and thereby retains the photographic plate 70, backing plate 71, and intermediate rubber filler 72 under pressure against the frame of the aperture 65.

Figure 7:
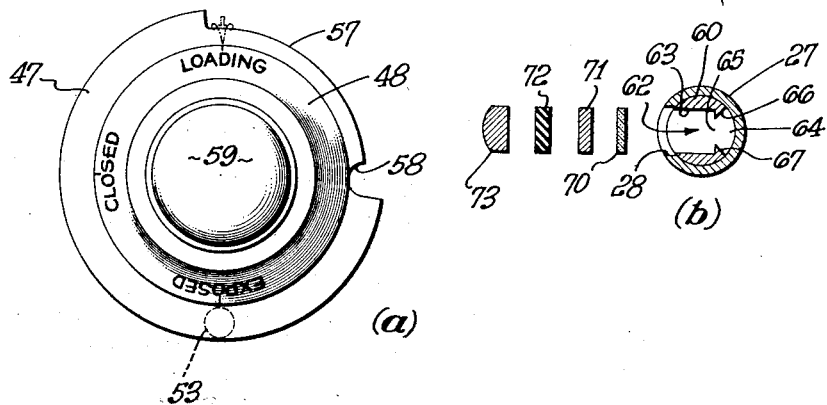
Figure 7 is a front elevational view of the dial of Figure 5 together with a corresponding cross-section of the plate holder, as adjusted to the loading position.

The length and width dimensions of the photographic plate 70, backing plate 71, intermediate rubber spacer 72 and cleat 73, are all substantially equal and such that they may be removed rearwardly from the rectangular portion 63 of the slot through the opening 28 in the tube 27 when the shaft 60 is rotated to a position 180° from the position shown in Figure 6 (b) to that shown in Figure 7 (b).

Referring again primarily to Figures 4 and 6, the dial 48 is there shown in the position indicated "Exposed," and in this position, the cammed portion 57 of the margin of the flange 47 is positioned within and in engagement with the slot 56 in the indexing stop pin 53. Under this condition, the dial 48, together with the disc 32, casing 27, and shaft 60 cannot be removed from the mounting M by reason of the locking action of the cam 57 in the slot 56. Similarly, when the dial 48 and the disc 32 are in these same relative positions, but have previously been removed from the mounting, they cannot be inserted into the mounting. Now, if the dial 48 is rotated counter-clockwise 90° from the position shown in Figure 6 to that shown in Figure 5, the U-shaped relieved portion 49 at the end of the cammed portion 57 of the dial flange will register with the indexing pin 53, and thus since no part of the flange 47 remains extending within the slot 56 of the stop pin 53, the beforementioned holder assembly comprising the dial 48 and disc 32, together with the casing tube 27 and the contained shaft 60 may be withdrawn longitudinally from the mounting M, and in this position the dial, as shown in Figure 5, will indicate that the film or plate-holder shaft is in the closed position. Thus, it is apparent that the film-holder can be withdrawn from or inserted into the mounting only when the dial 48 and the photographic plate-holder mechanism are adjusted to the closed position, thereby automatically preventing its removal in the exposed position with consequent inadvertment exposure of the photographic material.

After the dial 48, disc 32, and supporting casing 27 have been removed from the mounting in the closed position as before described, the dial 48 may then be rotated a further 90° counter-clockwise, to the point where the dial indicates the loading position, in which case the shaft 60 of the plate holder contained within the casing 27 will be in the position shown in Figure 7 (b) whereby the rectangular portion 63 of the slot 62 in the shaft 60 is brought into alignment and registration with the opening or window 28 in the casing 27 which allows the elements 70, 71, 72, and 73 to be either removed or inserted through the window 28 in the manner and in the relative order illustrated there in the exploded view.

A spring-pressed ball catch 75 contained within a drill hole 76 in the inner face of the dial 48, is adapted to drop into spherically shaped detents, as shown at 77, formed and positioned 90° apart in the adjacent face of the circular depression 47 of the disc 32, whereby when the plate holder assembly is removed from the mounting, the proper relative angular positions between the plate holder dial 48 and the disc 32 may be readily found for both loading and unloading adjustments of the holder and for readily adjusting and retaining the holder to the closed position preparatory to inserting the holder into the plate holder mounting.

The operation of the apparatus of the invention is as follows:

Assuming the plate holder assembly to be initially in the position illustrated in Figure 7 and having been removed from the mounting M, the holder may be loaded, in a dark room, the photographic plate 70, pressure plate 71, resilient strip 72 and fastening cleat 73 being inserted through the window 28 and into the rectangular space 63 in the shaft 60 in the order shown in Figure 7 (b). In fully assembled condition, the forward, upper and lower marginal portions of the photographic plate or film 70 are forced into firm engagement with the inner surfaces of the aperture shoulders 66 and 67 by the pressure plate 71.

After the film holder elements are assembled in the holder as hereinbefore described and before removal from the dark room, the shaft 60 is rotated in the casing 27 by the dial 48 and knob 59, from the loading position illustrated in Figure 7, clockwise through an angle of 90° to the closed position illustrated in Figure 5, in which case the window 28 in the casing 27 is closed by the solid side portion of the slotted shaft 60, and the photographic plate retained within the tube from which all light is thus excluded. In this position, the plate holder assembly P may be removed from the dark room and inserted into the mounting M, and at this adjustment, the U-shaped depression 58 in the margin of the dial 48 will register with the indexing pin 53, permitting the plate holder assembly P to be freely inserted into and seated in the mounting bushing 34 and caught and held in the fully inserted position by the ball catches 42 and 43. In this latter position, the flange 32 and the connected casing 27 will be located and fixed against angular displacement with respect to the mounting M by the indexing pin 53. During this installation of the holder assembly in the mounting, the photographic plate is in the closed position within the casing 27 as shown in Figure 5 (b), and thereby protected from exposure to the light.

Next, when it is desired to make an exposure of the thus installed plate or film in the optical apparatus, the dial is rotated clockwise 90° from the position shown in Figure 5 to that shown in Figure 6 with the result that the plate holder assembly is rotated within the casing 27 from the covered position of 5 (b) to the uncovered position of Figure 6 (b), and facing the window 28 in position for exposure to an image formed thereon by the reflector surface 11. In moving to this latter position, for exposure, the cammed portion 57 of the dial 48 is carried to a position where it extends into the slot 56 of the stop pin 53, which acts to lock the film holder assembly against inadvertent movement in or removal from the mounting while thus in the exposed position.

After exposure, the holder dial may be rotated back, counter-clockwise from the exposed position as shown in Figure 6 to that shown in Figure 5, thus freeing the dial cam from locking engagement with the indexing pin slot 56, after which the holder assembly will then be free for removal from the mounting and can be transferred in the light, to a dark room, and there opened to the loading position for removal of the plate or film for development.

It is to be noted that while the holder is in position in the plate holder mounting, the holder can only be rotated through an angular adjustment of 90° between exposed and closed positions as limited by the stopping action of the indexing pin 53 against the ends of cut-out cam portion of the dial flange 49, and thus inadvertent adjustment of the holder to the loading position with consequent release of the holder elements while in the mounting is precluded.

While, as before stated, the plate holder of this invention finds its primary application to optical systems where the photographic film or plate must be positioned where it will occultate a portion of the light beam, it also may be employed to advantage in other types of optical systems such as refractor telescopes, microscopes, cameras and the like instruments where compactness, freedom from extraneous detached parts which must be manipulated manually during exposure, and where automatic checks against inadvertent exposure are desired.

It is to be understood that the foregoing is illustrative only, and that the invention is not limited thereby, but may include various modifications and changes made by those skilled in the art without departure from the spirit and scope of the invention as defined in the appended claims.

I claim:

1. Photographic apparatus comprising: a holder for a sensitized photographic body; a casing for said holder having an aperture therein; means for moving said holder within said casing between exposed and unexposed positions with respect to said aperture; a mounting for holding said casing in a predetermined position therein; and lock means having one element thereof fixed to said mounting and another element thereof fixed to said holder and positioned to make interlocking engagement with one another when said holder is in the exposed position with respect to said aperture, thereby to prevent said holder from being either positioned in or withdrawn from said predetermined position in said mounting when said holder is in the said exposed position with respect to said aperture.

2. Photographic apparatus comprising: a holder for a sensitized photographic body; a casing for said holder having an aperture therein; means for moving said holder within said casing between exposed and unexposed positions with respect to said aperture; a mounting for holding said casing in a predetermined position therein; a lock means associated with said holder and said mounting, said lock means including an element fixed to said mounting and another element fixed to said holder and positioned to make interlocking engagement with one another when said holder is in the exposed position with respect to said aperture, and out of locking engagement with one another when said holder is in the unexposed position with respect to said aperture thereby to prevent said holder from being either positioned in or withdrawn from said predetermined position in said mounting when said holder is in the said exposed position with respect to said aperture and to allow said holder to be either positioned in or withdrawn from said predetermined position in said mounting when said holder is in the unexposed position with respect to said aperture.

3. Photographic apparatus comprising: a holder for a sensitized photographic body; a tubular casing for said holder having an aperture in the wall thereof; means for rotating said holder within said casing between exposed and unexposed positions with respect to said aperture; a quick detachable mounting for supporting said casing in a predetermined position therein; and a lock means having an element fixed to said mounting and another element fixed to said holder, said elements being adapted to effect a coupling between said holder and said mounting and thereby prevent said casing from being either positioned in or withdrawn from said predetermined position in said mounting when said holder is in the exposed position with respect to said aperture.

4. Photographic apparatus according to claim 3 in which said lock means comprises: an indexing member adapted to position said casing at a given rotational angle about its longitudinal axis with respect to said mounting.

5. Photographic apparatus according to claim 3 in which said lock means comprises: an indexing member adapted to position said casing, said holder and said mounting at given rotational angular positions with respect to one another about their common axes.

6. Photographic apparatus comprising: a shaft; a slot in said shaft; means adapted to hold a sensitized photographic body in said slot; a tubular casing surrounding said shaft and adapted to form a light-excluding covering for said slot; an aperture in the wall of said casing said aperture having substantially the same size and shape as the opening of said slot; means to rotate said shaft relative to said casing to move said slot rotationally between registered and unregistered positions with respect to said aperture; a mounting for supporting said casing; and positioning members one fixed to said casing and the other fixed to said mounting and adapted to interlock with one another to position and hold said casing in a predetermined position in said mounting.

7. Photographic apparatus comprising: a shaft; a slot in said shaft; means in said slot adapted to hold a sensitized photographic surface therein; a tubular casing surrounding said shaft and adapted to form a light-excluding covering for said slot; an aperture in the side wall of said casing said aperture having substantially the same size and shape as the opening of said slot; means to rotate said shaft relative to said casing to move said slot rotationally between registered and unregistered positions with respect to said aperture; a mounting for supporting said casing in a predetermined position therein; a cam fixed to and extending from said shaft; a latch member fixed on said mounting and having a recess therein adapted to receive a marginal portion of said cam in interlocking engagement therein upon rotation of said shaft relative to said casing said cam and latch member being positioned to so interlock when said casing is positioned in said predetermined position in said mounting and said shaft is rotated to a position with respect to said casing at which said slot registers with said aperture.

8. Photographic apparatus comprising: a shaft; a slot extending diametrally through said shaft; a tubular casing surrounding and rotatable upon said shaft and adapted to form a light-excluding covering for said slot; an aperture in the wall of said casing of substantially the same size and shape as said slot; means associated with said slot and adapted to hold a photographic sheet or plate member surface in a position transverse to said slot and adjacent one diametral extremity thereof to receive an image thereon when said slot is in registered position with respect to said aperture; said means including an inwardly projecting frame abutment adjacent one end of said slot against which the marginal portion of such a photographic sheet or plate member may be pressed and through which the balance of the area of said photographic member within the marginal portion thereof may be exposed to view; a pressure plate slidable diametrally within said slot and adapted to press such a photographic member in said position against said frame abutment; and a retainer means slidable diametrally within said slot and normally having an outer surface thereof in rotational sliding engagement with the inside surface of said tubular casing and adapted to retain and apply pressure to said pressure plate and thence to such photographic member in said slot against said frame abutment; means to rotate said shaft relative to said casing to move said slot between registered and unregistered positions with respect to said aperture; and a mounting for supporting said casing.

9. Photographic apparatus comprising: a shaft; a slot extending diametrally through said shaft; a tubular casing surrounding and rotatable upon said shaft and adapted to form a light-excluding covering for said slot; an aperture in the wall of said casing of substantially the same size and shape as said slot; means associated with said slot and adapted to hold a photographic sheet or plate member surface in a position transverse to said slot and adjacent one diametral extremity thereof to receive an image thereon when said slot is in registered position with respect to said aperture; said means including an inwardly projecting frame abutment adjacent one end of said slot against which the marginal portion of such a photographic sheet or plate member may be pressed and through which the balance of the area of said photographic member within the marginal portion thereof may be exposed to view; a pressure plate slidable diametrally within said slot and adapted to press such a photographic member in said position against said frame abutment; and a retainer means slidable diametrally within said slot and normally having an outer surface thereof in rotational sliding engagement with the inside surfaface of said tubular casing and adapted to retain and apply pressure to said pressure plate and thence to such photographic member in said slot against said frame abutment; said pressure plate and retainer means being insertable and removable through said aperture when said aperture is positioned in registry with the other diametral extremity of said slot; means to rotate said shaft relative to said casing to move either end of said slot between registered and unregistered positions with respect to said aperture; and a mounting for supporting said casing.

10. Photographic apparatus according to claim 8 and with resilient pressure distributing means in said slot between said pressure plate and said retainer means.

11. Photographic apparatus according to claim 9 and with resilient pressure distributing means in said slot between said pressure plate and said retainer means.

12. Photographic apparatus according to claim 9 and indexing means associated with said mounting, said casing and said shaft operative to prevent said shaft from being rotated with respect to said casing to a position effecting registry between said aperture and the said other diametral extremity of said slot while said casing is positioned in said mounting.

13. Photographic apparatus comprising: a shaft; a slot in said shaft; means adapted to hold a sensitized photographic body in said slot; a tubular casing surrounding said shaft and adapted to form a light-excluding covering for said slot; an aperture in the wall of said casing, said aperture having substantially the same size and shape as the opening of said slot; means to rotate said shaft relative to said casing to move said slot rotationally between registered and unregistered positions with respect to said aperture; a mounting for supporting said casing in a predetermined stationary position; and indexing means on said mounting adapted to engage a member of said casing to couple said casing and said mounting together in fixed angular position with respect to one another about the axis of said casing when said casing is positioned in said predetermined position in said mounting; and means fixed to said shaft and positioned to contact said indexing means to prevent said casing from being placed in said mounting in said predetermined position when said shaft is in such rotational position relative to said casing that said slot is in said registered position with respect to said aperture.

14. Photographic apparatus comprising: a shaft; a slot in said shaft; means adapted to hold a sensitized photographic body in said slot; a tubular casing surrounding said shaft and adapted to form a light-excluding covering for said slot; an aperture in the wall of said casing, said aperture having substantially the same size and shape as the opening of said slot; means to rotate said shaft relative to said casing to move said slot rotationally between registered and unregistered positions with respect to said aperture; a mounting for supporting and holding said casing in a predetermined position relative to said mounting; indexing means on said mounting adapted to engage a member on said casing to couple said casing and said mounting together in fixed angular position with respect to one another about their common longitudinal axes when said casing is positioned in said predetermined position in said mounting; and means associated with said indexing means and said shaft to prevent said casing from being moved from said predetermined position in said mounting while said shaft is in such rotational position relative to said casing that said slot is in registered position with respect to said aperture.

15. Photographic apparatus comprising: a shaft; a slot in said shaft; means adapted to hold a sensitized photographic body in said slot; a tubular casing surrounding said shaft and adapted to form a light-excluding covering for said slot; an aperture in the wall of said casing said aperture being substantially the same size and shape as the opening of said slot; means to rotate said shaft relative to said casing to move said slot rotationally between registered and unregistered positions with respect to said aperture; a mounting for supporting and holding said casing in a predetermined stationary position relative to said mounting; an indexing means adapted to make coupling engagement between said shaft and said mounting to prevent said casing from being either positioned in or withdrawn from said mounting while said shaft is in such rotational position relative to said casing that said slot is in registered position with respect to said aperture.

16. Photographic apparatus comprising: a shaft; a slot in said shaft; means adapted to hold a sensitized photographic body in said slot; a tubular casing surrounding said shaft and adapted to form a light-excluding covering for said slot; an aperture in the side wall of said casing; means to rotate said shaft and said casing relative to one another to move said slot rotationally between unregistered, light-excluding and registered, light-admitting positions with respect to said aperture; a mounting body to hold said casing in a predetermined position; a lug member fixed to said mounting body and formed with a recess transverse to the longitudinal axis of said shaft; a cam member fixed to said shaft and positioned to move laterally into said recess in longitudinal locking engagement with said lug when said casing is in said predetermined position in said mounting and said shaft is rotated relative to said casing to a position at which said slot and said aperture are registered, and to move laterally out of said recess and out of longitudinal engagement with said lug when said shaft is rotated relative to said casing to a position at which said slot and said aperture are unregistered.

GUSTAVE FASSIN.

REFERENCES CITED

The following references are of record in the file of this patent:

UNITED STATES PATENTS

| Number | Name | Date |
|---|---|---|
| 1,527,476 | Gianetto | Feb. 24, 1925 |
| 1,828,141 | Back | Oct. 20, 1931 |
| 1,955,300 | Kurnick | Apr. 17, 1934 |
| 2,237,656 | Covell | Aug. 8, 1941 |
| 2,282,869 | Johnson et al. | May 12, 1942 |
| 2,298,574 | Lockhart | Oct. 13, 1942 |
| 2,439,112 | Teague | Apr. 6, 1948 |

FOREIGN PATENTS

| Number | Country | Date |
|---|---|---|
| 6,932 | Great Britain | Mar. 28, 1908 |